United States Patent [19]
Sugimoto et al.

[11] Patent Number: 6,087,975
[45] Date of Patent: Jul. 11, 2000

[54] OBJECT DETECTING SYSTEM FOR VEHICLE

[75] Inventors: Yoichi Sugimoto; Yasuhiko Fujita, both of Saitama, Japan

[73] Assignee: Honda Giken Kogyo Kabushiki Kaisha, Tokyo, Japan

[21] Appl. No.: 09/102,637

[22] Filed: Jun. 23, 1998

[30] Foreign Application Priority Data

Jun. 25, 1997 [JP] Japan .................................. 9-168517
Jun. 25, 1997 [JP] Japan .................................. 9-168518

[51] Int. Cl.⁷ .............................. G01S 13/93; G08G 1/16
[52] U.S. Cl. ............................... 342/70; 340/903; 342/71
[58] Field of Search ........................... 342/70, 71, 72; 340/435, 436, 903; 343/710, 711

[56] References Cited

U.S. PATENT DOCUMENTS

| | | | |
|---|---|---|---|
| 4,757,450 | 7/1988 | Etoh | 342/70 |
| 5,227,784 | 7/1993 | Masamori et al. | 342/70 |
| 5,574,463 | 11/1996 | Shirai et al. | 342/70 |
| 5,629,704 | 5/1997 | Throngnumchai et al. | 342/54 |
| 5,675,326 | 10/1997 | Juds et al. | 340/436 |
| 5,680,117 | 10/1997 | Arai et al. | 340/435 |
| 5,731,779 | 3/1998 | Kikuchi | 342/70 |
| 5,864,391 | 1/1999 | Hosokawa et al. | 356/4.01 |

FOREIGN PATENT DOCUMENTS 8-240660  9/1996  Japan .

*Primary Examiner*—Ian J. Lobo
*Attorney, Agent, or Firm*—Arent, Fox, Kintner, Plotkin & Kahn

[57] ABSTRACT

An object detecting system for a vehicle includes a radar. The radar includes an electromagnetic wave transmitting device for transmitting an electromagnetic wave in a direction of movement of the vehicle and a reflected wave receiving device for receiving a reflected wave from an object which exists ahead of the vehicle in the direction of movement of the vehicle. A determining device determines the presence or absence of an obstacle in the direction of movement of the vehicle based on the result of the detection by the radar. In the object detecting system, the radar can detect objects in a plurality of vertically different detection areas, respectively. In addition, it is clear in which areas the object has been detected. Thus, it is possible to appropriately determine whether there is a possibility that the object is an obstacle to the vehicle.

16 Claims, 12 Drawing Sheets

OBJECT DETECTING SYSTEM FOR VEHICLE

BACKGROUND OF THE INVENTION

1. Field of the Invention

The present invention relates to an object detecting system for a vehicle, which is designed to detect an object which may possibly be an obstacle to a traveling vehicle, e.g., a moving object such as a vehicle traveling ahead of the subject vehicle, or a stationary object such as a vehicle stopped on a road, a dropped object and the like, based on transmission of an electromagnetic wave and the reception of such an electromagnetic wave.

2. Description of the Related Art

A conventionally known object detecting system, as disclosed, for example, in Japanese Patent Application Laid-open No. 8-240660, detects an obstacle existing ahead of the subject vehicle in a direction of movement of the subject vehicle based on the result of, a detection performed out by radar which transmits an electromagnetic wave, such as a laser, forwards in a direction of movement of the vehicle and which receives an electromagnetic wave reflected from the object. Thus, a warning is emitted, or an avoiding movement of the vehicle for avoiding collision of the vehicle with the object is automatically carried out.

The above known system detects only an obstacle existing on a road on which the vehicle is moving. This system is adapted to transmit the electromagnetic wave forwards in the direction of movement of the subject vehicle and in a direction substantially parallel to the road, thereby detecting only an obstacle existing ahead of the subject vehicle in the direction of movement of the subject vehicle presumably based on a steering angle, a yaw rate and the like.

However, on an actual road on which the vehicle is traveling, a footbridge and a signpost exist over the road, and/or a cateye is embedded in the surface of the road. Therefore, it is desired to avoid detecting these objects as obstacles since any of these objects are not actually obstacles. Thereupon, it is conceived that an electromagnetic wave is transmitted at a relatively narrow vertical angle to detect an obstacle only in a direction substantially parallel to the road. However, is the pitch angle of the vehicle varies due to many factors such as the acceleration or deceleration of the vehicle, the undulation of the road surface, the loaded state of the vehicle and the like. Thus, the angle of transmission of the electromagnetic wave with respect to the road varies due to the variation in pitch angle. Therefore, there is a possibility that an object, which exists on the road ahead of the vehicle in the direction of movement of the vehicle and which should be detected as an obstacle, may not be detected. In contrast, an object which exists over the road or exists on the road and which is not an obstacle, may be mis-detected.

SUMMARY OF THE INVENTION

Accordingly, it is an object of the present invention to provide an object detecting system for a vehicle, wherein objects can be detected in a plurality of different vertical areas relative to the vehicle, thereby avoiding mis-detection of the object, and avoiding difficulty in detecting an obstacle.

To achieve the above object, according to the present invention, there is provided an object detecting system for a vehicle, comprising a radar which includes an electromagnetic wave transmitting means for transmitting an electromagnetic wave in a direction of movement of the vehicle, and a reflected wave receiving means for receiving a reflected wave from an object existing ahead of the vehicle in the direction of movement of the vehicle. A determining means determines the presence or absence of an obstacle in the direction of movement of the vehicle based on the result of the detection by the radar. Thus, the radar can detect objects in each of a plurality of vertically different detection areas.

With the above arrangement, the radar can detect objects in each of the plurality of vertically different areas, and can detect the object in any one of the areas, even if the pitch angle of the vehicle is varied. In addition, it is clear in which of the areas the object has been detected. Thus, it is possible to appropriately perform the determination of whether there is a possibility that the object is an obstacle to the vehicle.

According to another aspect and feature of the present invention, the object detecting system further includes a pitch angle detecting means for detecting a pitch angle of the vehicle, and a selecting means for selecting one of reflected waves received by the reflected wave receiving means, which is a reflected electromagnetic wave transmitted from the electromagnetic wave transmitting means at an angle nearest to an angle parallel to a travel road surface based on the result of the detection by the pitch angle detecting means. Thus, even if the pitch angle of the vehicle is varied, only the detected object existing ahead of the vehicle in the direction of movement of the vehicle and in the direction substantially parallel to the travel road surface can be detected as an object for determining whether it is recognized as an obstacle. Therefore, it is possible to prevent losing sight of the obstacle, or to prevent a detected object which is not an obstacle from being mis-detected as an obstacle.

According to a further aspect and feature of the present invention, the detection areas are established, so that an overlapped region, produced by the overlapping of the detection areas on each other, includes a region parallel to the travel road surface. Thus, when the detecting direction of the radar is not vertically offset, the object can be reliably detected in the overlapped region. Even when the detecting direction of the radar is vertically offset, the object can be detected in either one of the plurality of vertically different detection areas. Hence, it is not difficult to detect the object.

According to a yet further aspect and feature of the present invention, the object detecting system further includes an abnormality determining means for determining that the radar is abnormal, based on the radar detecting the existence of the object in a region other than the overlapped region in a state in which the attitude of the vehicle is substantially parallel to the travel road surface. Thus, in a normal state, in which the detecting direction of the radar is not vertically offset, the object must be detected in the overlapped region including the region parallel to the travel road surface. Hence, when the existence of the object in the region other than the overlapped region is detected, it can be determined that the radar is in an abnormal state in which the detecting direction thereof has been offset either upwards or downwards.

According to a further aspect and feature of the present invention, the object detecting system further includes an abnormality alarm which is operated in response to the determination that the radar is determined to be abnormal by the abnormality determining means. Thus, it is possible to immediately notify a driver of the fact that the radar is abnormal.

According to a further aspect and feature of the present invention, the abnormality determining means stores the result of the determination at the time when it is determined that the radar is abnormal, irrespective of the operational state of the vehicle, until the radar detects the object. As long as such storage is continued, the abnormality determining means outputs a signal indicative of a command to operate the abnormality alarm. Thus, even if the vehicle is stopped after it is determined by the abnormality determining means that the radar is abnormal, it is possible to notify a driver that the radar is abnormal when the vehicle is restarted.

Further, according to another aspect and feature of the present invention, the object detecting system further includes a vehicle speed detecting means for detecting a vehicle speed. The abnormality determining means is arranged, so that the object determined as a moving object, based on the result of the detection by the radar and a value detected by the vehicle speed detecting means, is used for determining whether the radar is abnormal. Thus, it cannot be determined that the radar is abnormal, based on detection of a stationary object which is not an obstacle to the traveling of the vehicle, such as a signpost, a cateye and the like.

The above and other objects, features and advantages of the invention will become apparent from the following description of the preferred embodiments taken in conjunction with the accompanying drawings.

BRIEF DESCRIPTION OF THE DRAWINGS

FIGS. 1 to 3 show a first embodiment of the present invention, wherein

FIGS. 6 and 7 show a fourth embodiment of the present invention, wherein

FIGS. 8 to 10 show a fifth embodiment of the present invention, wherein

FIGS. 11 and 12 show a sixth embodiment of the present invention, wherein

DETAILED DESCRIPTION OF THE PREFERRED EMBODIMENTS

The present invention will now be described by way of embodiments with reference to the accompanying drawings.

Figure 1:
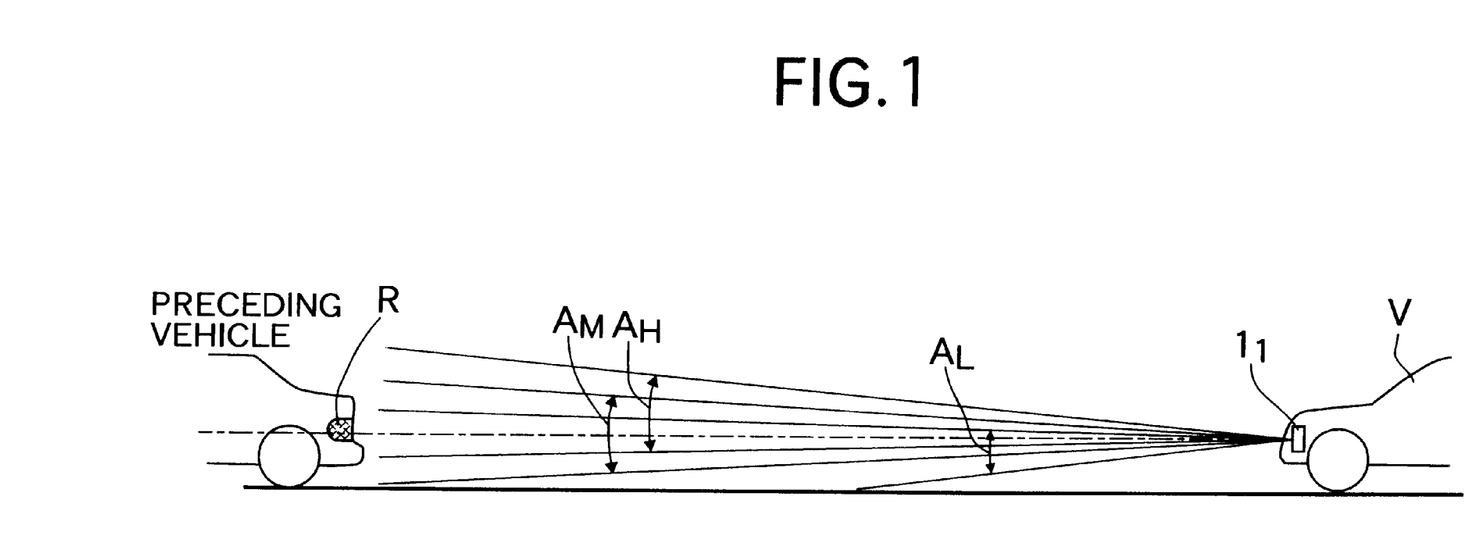
FIG. 1 is a diagram showing areas for detection by a radar mounted on a vehicle.

A first embodiment of the present invention will be described with reference to FIGS. 1 to 3. Referring first to FIG. 1, a radar $1_1$ is mounted at a front portion of a vehicle V. The radar $1_1$ is constructed to be able to detect objects in a plurality of, e.g., three detection areas $A_H$, $A_M$ and $A_L$ at vertically different angles in a forward direction of movement of the vehicle V.

Among the detection areas $A_H$, $A_M$ and $A_L$, the upper area $A_H$ assumes an forward ascending angle of, for example, 1.5 degrees when the vehicle V is in a normal traveling state, i.e., when the vehicle is traveling with a light load at a substantially constant speed on a flat ground. The lower detection area $A_L$ assumes a forward descending angle of, for example, 1.5 degrees when the vehicle V is in the normal traveling state. The vertically middle detection area $A_M$ assumes an angle including a region parallel to a travel road surface when the vehicle is in the normal traveling state. Spread angles of the detection areas $A_H$, $A_M$ and $A_L$ are set, for example, at 2 degrees, so that no area is omitted between the detection areas $A_H$, $A_M$ and $A_L$. An upper portion of the middle detection area $A_M$ is slightly overlapped on a lower portion of the upper detection area $A_H$, and a lower portion of the middle detection area $A_M$ is slightly overlapped on an upper portion of the lower detection area $A_L$. From the viewpoint of preventing a rear end collision during traveling of the vehicle V, an object to be detected is a vehicle traveling ahead of the subject vehicle V (which will be referred to as a preceding vehicle). An overlapped region of the detection areas $A_H$ and $A_M$, an overlapped region of the detection areas $A_M$ and $A_L$ and an overlapped region of the detection areas $A_H$, $A_M$ and $A_L$ are established, so that a reflector R, mounted at a rear portion of the preceding vehicle, is located within these overlapped regions.

Figure 2:
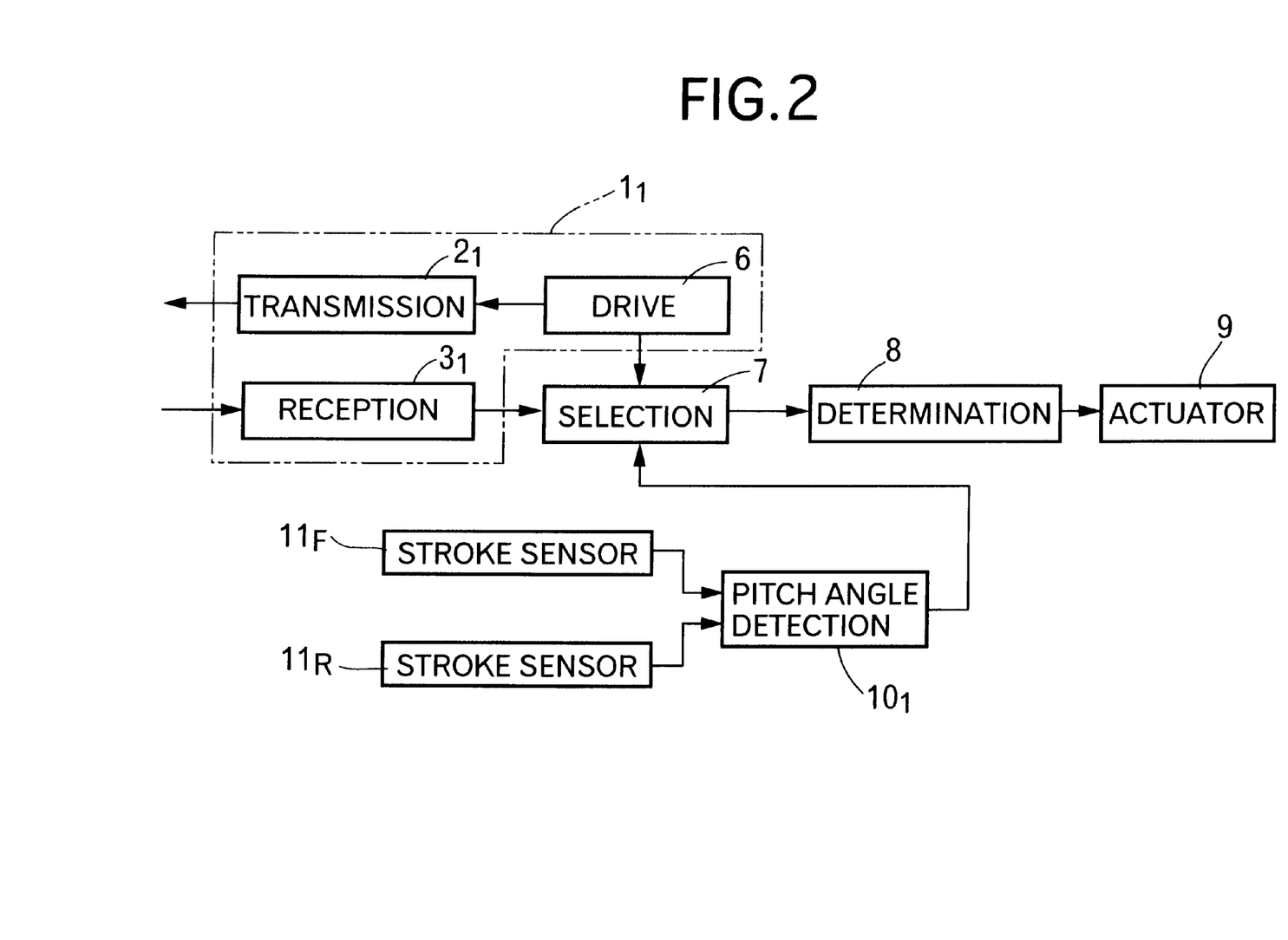
FIG. 2 is a block diagram showing the arrangement of an object detecting system.
Figure 3:
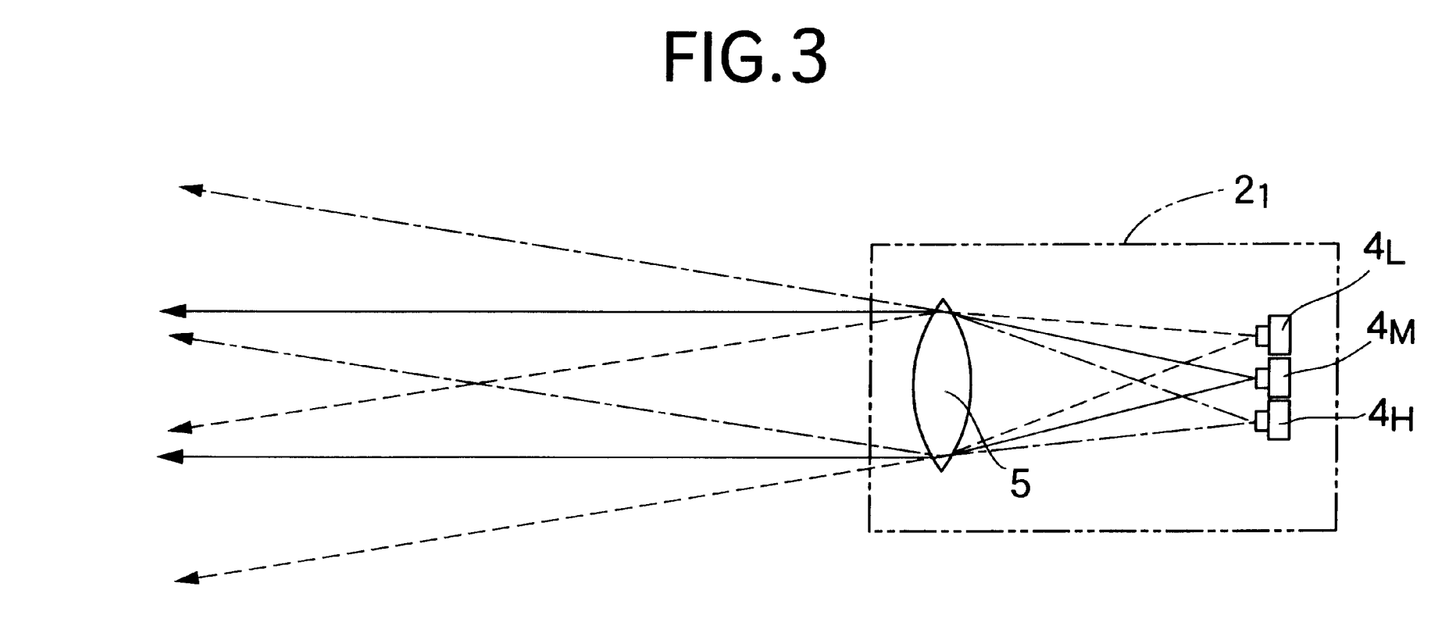
FIG. 3 is a diagram showing the arrangement of an electromagnetic wave transmitting means.

Referring to FIG. 2, the radar $1_1$ includes a) an electromagnetic wave transmitting means $2_1$ for transmitting electromagnetic waves forwards in the direction of movement of the vehicle V in a plurality of vertically different angle directions in correspondence to the detection areas $A_H$, $A_M$ and $A_L$, and b) a reflected wave receiving means $3_1$ for receiving reflected waves produced by the reflection of the electromagnetic waves transmitted from the electromagnetic wave transmitting means $2_1$ from an object existing in the movement direction.

The electromagnetic wave transmitting means $2_1$ includes a plurality of, e.g., three laser diodes $4_H$, $4_M$ and $4_L$ which are transmitters for transmitting a laser which is an electromagnetic wave, and a light feed lens disposed in front of the laser diodes $4_H$, $4_M$ and $4_L$. The laser diodes $4_H$, $4_M$ and $4_L$ are sequentially activated by a drive means 6 shown in FIG. 2. The optical axis of the light feed lens 5 is established, so that it is substantially parallel to the travel road surface, when the vehicle V is in the normal traveling state. The laser diode $4_M$ is disposed on the optical axis of the light feed lens 5 to transmit the laser, corresponding to the detection area $A_M$, forwards in the movement direction through the light feed lens 5. The laser diode $4_H$ is disposed at a location offset downwards, for example, by 1.5 degrees with respect to the optical axis of the light feed lens 5 and transmits the laser corresponding to the detection area $A_H$ through the light feed lens 5 forwards in the movement direction. The laser diode $4_L$ is disposed at a location offset upwards, for example, by 1.5 degrees with respect to the optical axis of the light feed lens 5 and transmits the laser corresponding to the detection area $A_L$ through the light feed lens 5 forwards in the movement direction.

When the laser from each of the laser diodes $4_H$, $4_M$ and $4_L$ is scanned in a horizontal direction, a scanning rotatable mirror or the like may be disposed between the laser diodes $4_H$, $4_M$ and $4_L$ and the light feed lens 5, or in front of the light feed lens 5.

The reflected wave receiving means $3_1$ receives a reflected wave in each of the detection areas $A_H$, $A_M$ and $A_L$. The reception result provided by the reflected wave receiving means $3_1$ is input to a selecting means 7.

A signal selected by the selecting means 7 is input to a determination means 8, in which the presence or absence of an obstacle ahead of the vehicle V in the direction of movement of the vehicle V is determined. Based on the result of the determination by the determination means 8, an actuator 9 such as an alarm, an automatic brake and the like is operated.

The selecting means 7 selects one of reflected waves received by the reflected wave receiving means $3_1$, which is a reflected wave of the electromagnetic wave transmitted from the electromagnetic wave transmitting means $2_1$ at an angle nearest to an angle parallel to the travel road surface based on the result of the detection by a pitch angle detecting means $10_1$. A signal indicative of a timing of transmission by each of the laser diodes $4_H$, $4_M$ and $4_L$ in the electromagnetic wave transmitting means $2_1$ is input from the drive means 6 to the selecting means 7. The result of the detection by the pitch angle detecting means $10_1$ is also input to the selecting means 7.

The pitch angle detecting means $10_1$ is formed to detect a pitch angle $\alpha$ of the vehicle based on a detection value detected by a stroke sensor $11_F$ for detecting a stroke of a front suspension (not shown) in the vehicle V, and a detection value detected by a stroke sensor $11_R$ for detecting a stroke of a rear suspension (not shown).

The pitch angle $\alpha$ is calculated in the pitch angle detecting means $10_1$ according to the following equation:

$$\alpha = (S_F - S_R)/L$$

wherein $S_F$ is a stroke of the front suspension; $S_R$ is a stroke of the rear suspension; and L is a wheel base of the vehicle V.

When the pitch angle a determined by the pitch angle detecting means $10_1$ indicates that the vehicle V is in a state in which it is forwardly pitched upwards, for example, at 1 degree or more, the selecting means 7 selects one of the reflected waves received by the reflected wave receiving means $3_1$, which corresponds to an angle nearest to the angle parallel to the travel road surface, i.e., corresponds to the detection area $A_L$. When the pitch angle $\alpha$ indicates that the vehicle V is in a state in which it is forwardly pitched downwards, for example, at 1 degree or more, the selecting means 7 selects one of the reflected waves received by the reflected wave receiving means $3_1$, which corresponds to an angle nearest to the angle parallel to the travel road surface, i.e., corresponds to the detection area $A_H$. Further, when the pitch angle $\alpha$ indicates that the vehicle V is in a state in which it is forwardly turned-down or turned-up, for example, at an angle smaller than 1 degree, and in a horizontal state, the selecting means 7 selects one of the reflected waves received by the reflected wave receiving means $3_1$, which corresponds to the detection area $A_M$.

The operation of the first embodiment will be described below. The radar $1_1$ is capable of detecting objects in the plurality of vertically different areas $A_H$, $A_M$ and $A_L$, whereby an object can be detected in any of the areas $A_H$, $A_M$ and $A_L$, despite a variation in pitch angle of the vehicle V. In addition, it is obvious in which of the areas $A_H$, $A_M$ and $A_L$ the object has been detected, whereby it can be appropriately determined whether there is a possibility that the object, which exists forwards in the direction of movement of the vehicle, will become an obstacle to the vehicle.

Moreover, to ensure that the objects can be detected in the plurality of vertically different areas $A_H$, $A_M$ and $A_L$, the radar $1_1$ includes the plurality of, e.g., three laser diodes $4_H$, $4_M$ and $4_L$ which transmit electromagnetic waves in a plurality of vertically different angle directions. The radar $1_1$ can be provided with a function of detecting objects in the plurality of vertically different areas $A_H$, $A_M$ and $A_L$, using a simple construction.

Further, the pitch angle of the vehicle V is detected by the pitch angle detecting means $10_1$. One of the reflected waves received by the reflected wave receiving means $3_1$, which has been transmitted from the electromagnetic wave transmitting means $2_1$ at the angle nearest to the angle parallel to the travel road surface based on the result of the detection by the pitch angle detecting means $10_1$, is selected by the selecting means 7. The obstacle is determined, by the determination means 8, based on the selected reflected wave. Therefore, even if the pitch angle of the vehicle V is varied, the determination of the obstacle by the determination means 8 can be carried out for determining whether a detected object, only existing in the direction substantially parallel to the travel road surface in the direction of movement of the vehicle V, is recognized as an obstacle. Thus, it is possible to prevent losing sight of the obstacle due to the variation in pitch angle of the vehicle V, or to prevent a detected object, which is not an obstacle, from being misdetected as an obstacle.

The pitch angle detecting means $10_1$ may be a means for detecting a pitch angle based on an indicator representative of the strokes of the front and rear suspensions of the vehicle V. In place of the detection values detected by the stroke sensors $11_F$ and $11_R$, rotational angles of suspension arms in the front and rear suspensions, a rotational angle of a stabilizer and the like may be employed.

Figure 4:
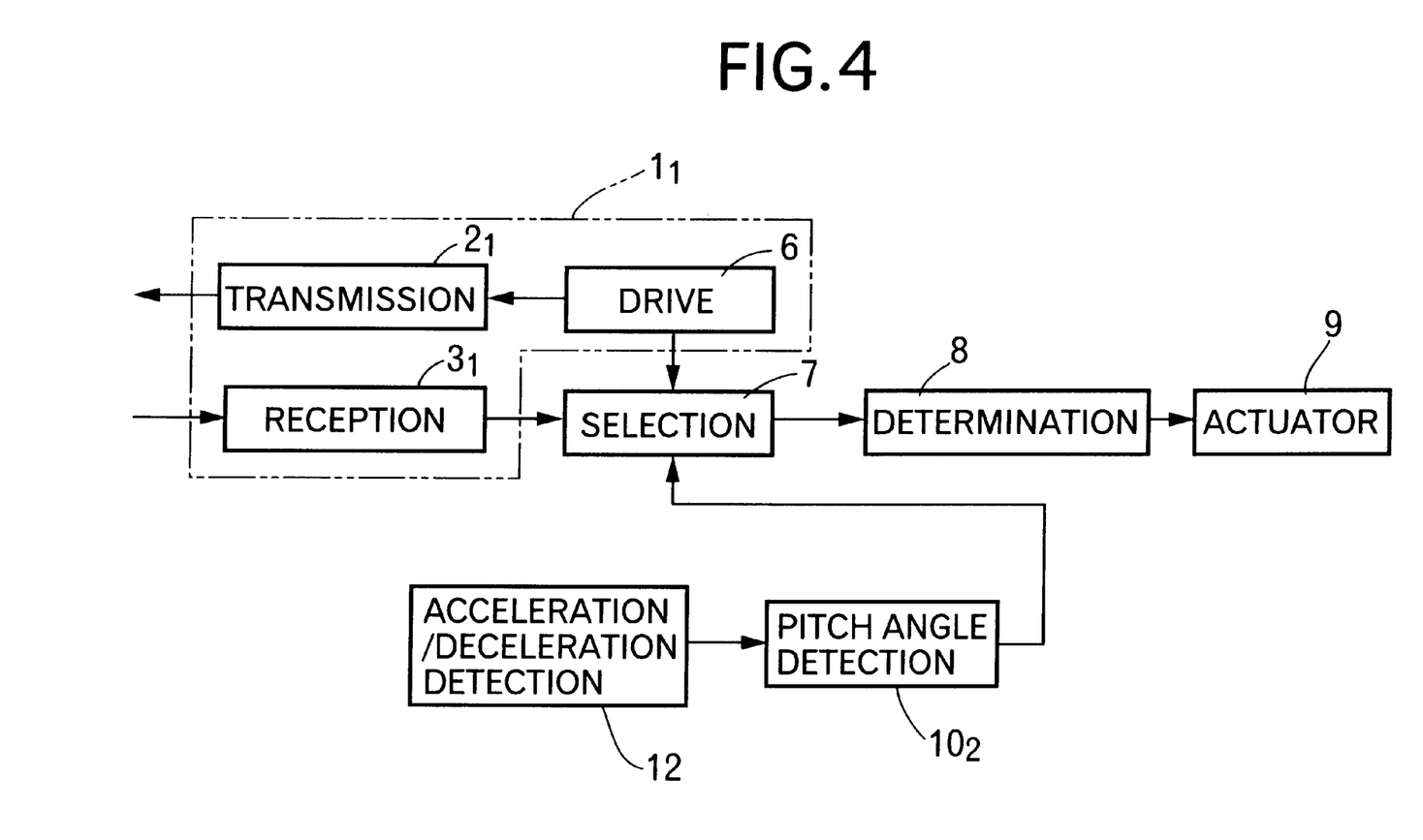
FIG. 4 is a block diagram showing the arrangement of an object detecting system according to a second embodiment of the present invention.

In a second embodiment of the present invention, as shown in FIG. 4, an acceleration/deceleration detecting means 12 for detecting an acceleration or deceleration of the vehicle V may be mounted in the vehicle V. A pitch angle detecting means $10_2$ may be arranged to detect a pitch angle from the acceleration or deceleration detected by the acceleration/deceleration detecting means 12, the height of the center of gravity of the vehicle V, the spring constants of the suspensions and the wheel base.

Figure 5:
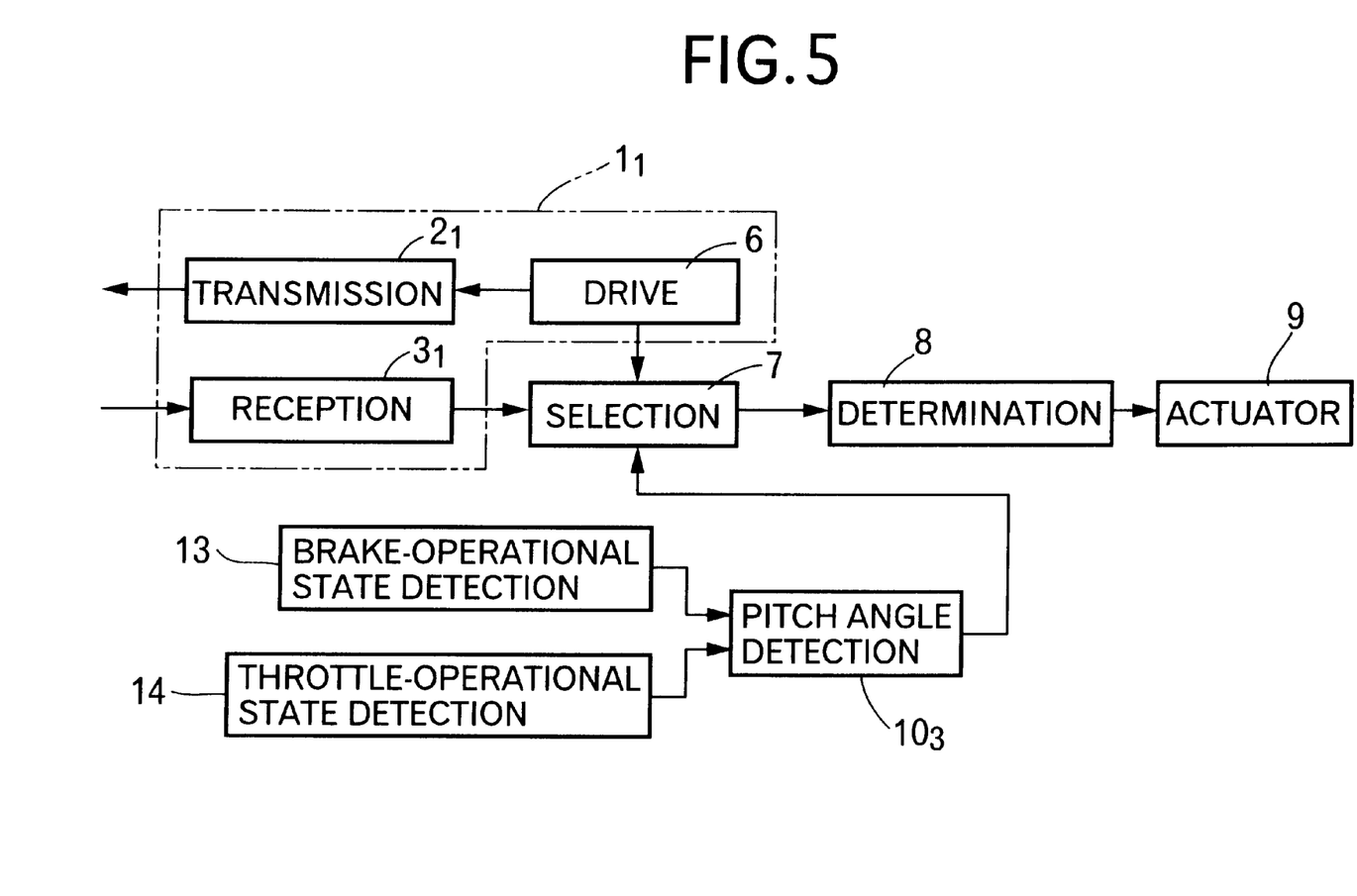
FIG. 5 is a block diagram showing the arrangement of an object detecting system according to a third embodiment of the present invention.

In a third embodiment of the present invention, as shown in FIG. 5, a brake-operational state detecting means 13 for detecting the state of operation of a brake and a throttle-operational state detecting means 14 for detecting the state of operation of a throttle may be mounted in the vehicle V. A pitch angle detecting means $10_3$ may be arranged to detect a pitch angle based on the detection results provided by the detecting means 13 and 14. Alternatively, the pitch angle detecting means $10_3$ may be arranged to detect a pitch angle using either one of the values detected by the brake-operational state detecting means 13 and the throttle-operational state detecting means 14.

Figure 6:
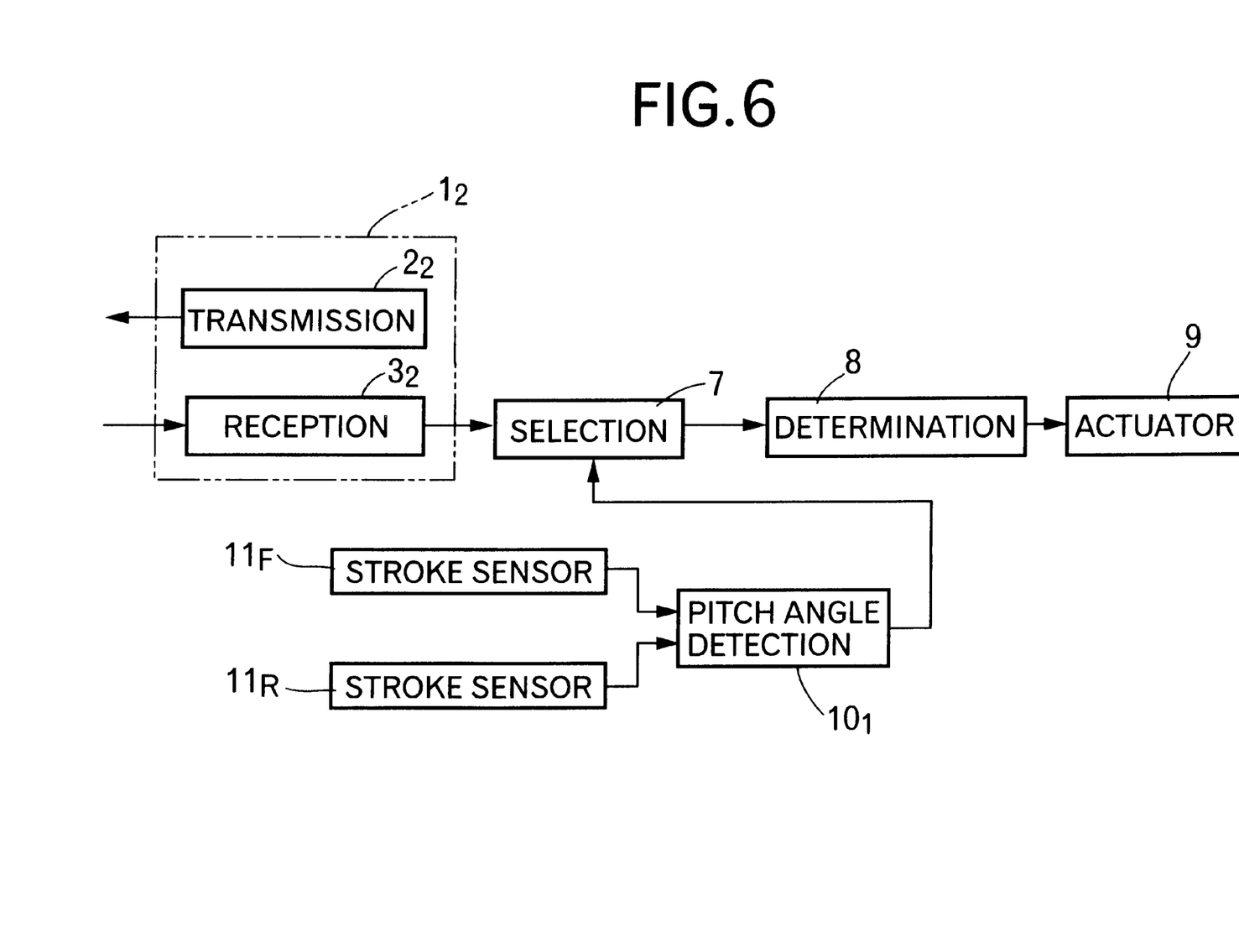
FIG. 6 is a block diagram showing the arrangement of an object detecting system.
Figure 7:
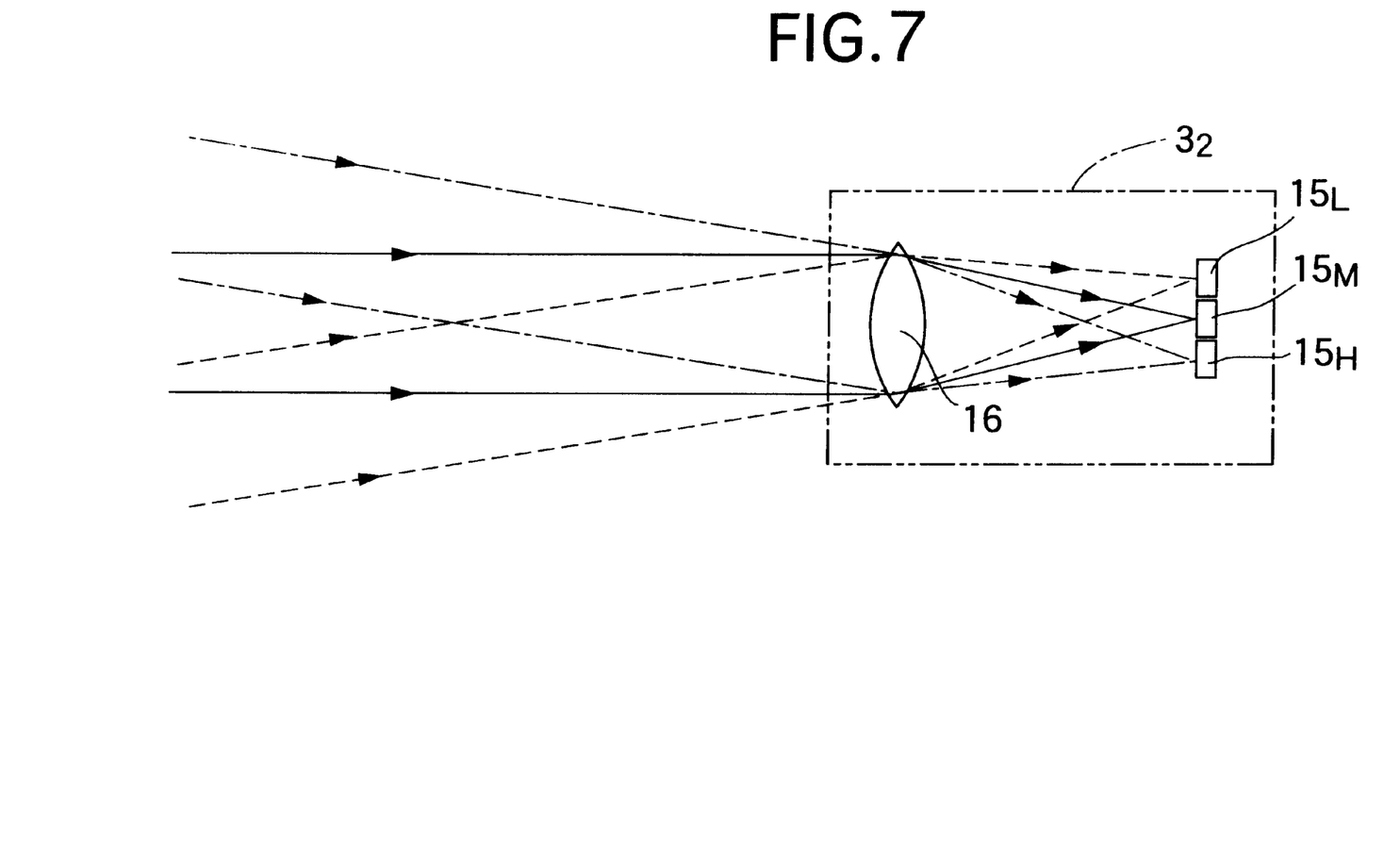
FIG. 7 is a diagram showing the arrangement of a reflected wave receiving means.

A fourth embodiment of the present invention will now be described with reference to FIGS. 6 and 7. A radar $1_2$ includes an electromagnetic wave transmitting means $2_2$ for transmitting a laser as an electromagnetic wave forwards in the direction of movement of the vehicle V, and a reflected wave receiving means $3_2$ for receiving, in a plurality of vertically different angle directions, reflected waves produced by the reflection of the electromagnetic wave transmitted from the electromagnetic wave transmitting means $2_2$, from an object existing in the direction of movement of the vehicle V. One of the reflected waves received by the reflected wave receiving means $3_2$, which corresponds to an angle nearest to the angle parallel to the travel road surface based on the detection result provided by the pitch angle detecting means $10_1$, is selected by the selecting means 7.

The reflected wave receiving means $3_2$ includes a plurality of, e.g., three photo diodes $15_H$, $15_M$ and $15_L$ which are receivers for receiving reflected waves of a laser to generate a signal, and a light receiving lens 16 which is disposed in front of the photo diodes $15_H$, $15_M$ and $15_L$. The optical axis of the light receiving lens 16 is established so that it is substantially parallel to a travel road surface, when the vehicle V is in a normal traveling state. The photo diode $15_M$ is disposed on the optical axis of the light receiving lens 16 to receive the reflected wave of laser corresponding to the detection area $A_M$ (see FIG. 1) through the light receiving lens 16. The photo diode $15_H$ is disposed at a location offset downwards, for example, by 1.5 degrees with respect to the optical axis of the light receiving lens 16 to receive the reflected wave of laser corresponding to the detection area $A_H$ (see FIG. 1) through the light receiving lens 16. The photo diode $15_L$ is disposed at a location offset upwards, for example, by 1.5 degrees with respect to the optical axis of the light receiving lens 16 to receive the reflected wave of laser corresponding to the detection area $A_L$ through the light receiving lens 16. The electromagnetic wave transmitting means $2_2$ is formed to transmit the laser as an electromagnetic wave over all of the areas $A_H$, $A_M$ and $A_L$.

Even with the fourth embodiment, an effect similar to that in each of the above-described embodiments can be provided.

Figure 8:
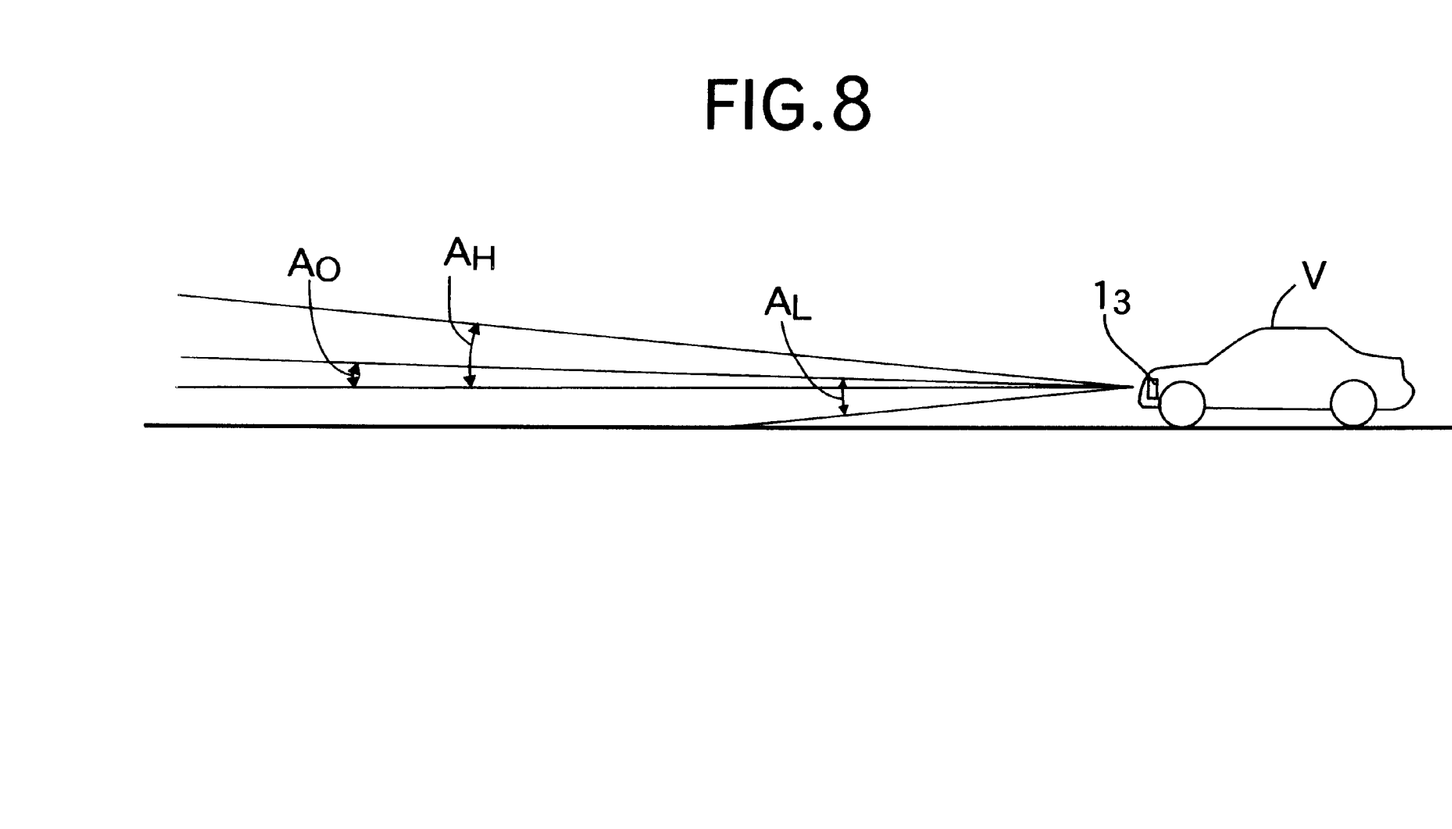
FIG. 8 is a diagram showing areas for detection by a radar mounted on a vehicle.

A fifth embodiment of the present invention will now be described with reference to FIGS. 8 to 10. Referring first to FIG. 8, a radar $1_3$ is mounted at a front portion of a vehicle V. The radar $1_3$ is constructed to be able to detect objects in a plurality of, e.g., two detection areas $A_H$ and $A_L$ at vertically different angles ahead of the vehicle V in a direction of movement of the vehicle V.

The upper detection area $A_H$ has a forwardly turned-up spread angle of, for example, 4 degrees, when the vehicle V is in a normal traveling state, i.e., when the vehicle V is traveling with a light load at a substantially constant speed on a flat ground. The lower detection area $A_L$ has a forwardly turned-down spread angle of, for example, 4 degrees, when the vehicle V is in a normal traveling state. An overlapped region $A_O$ is established in the detection areas $A_H$ and $A_L$ by overlapping of the detection areas $A_H$ and $A_L$, for example, at about 2 degrees, so that a region parallel to the travel road surface in a normal traveling state of the vehicle V and a reflector on another vehicle existing in the direction of movement of the vehicle V are included in the overlapped region $A_O$. The overlapped region $A_O$ includes a region parallel to the travel road surface, when the vehicle V is in the normal traveling state.

Figure 9:
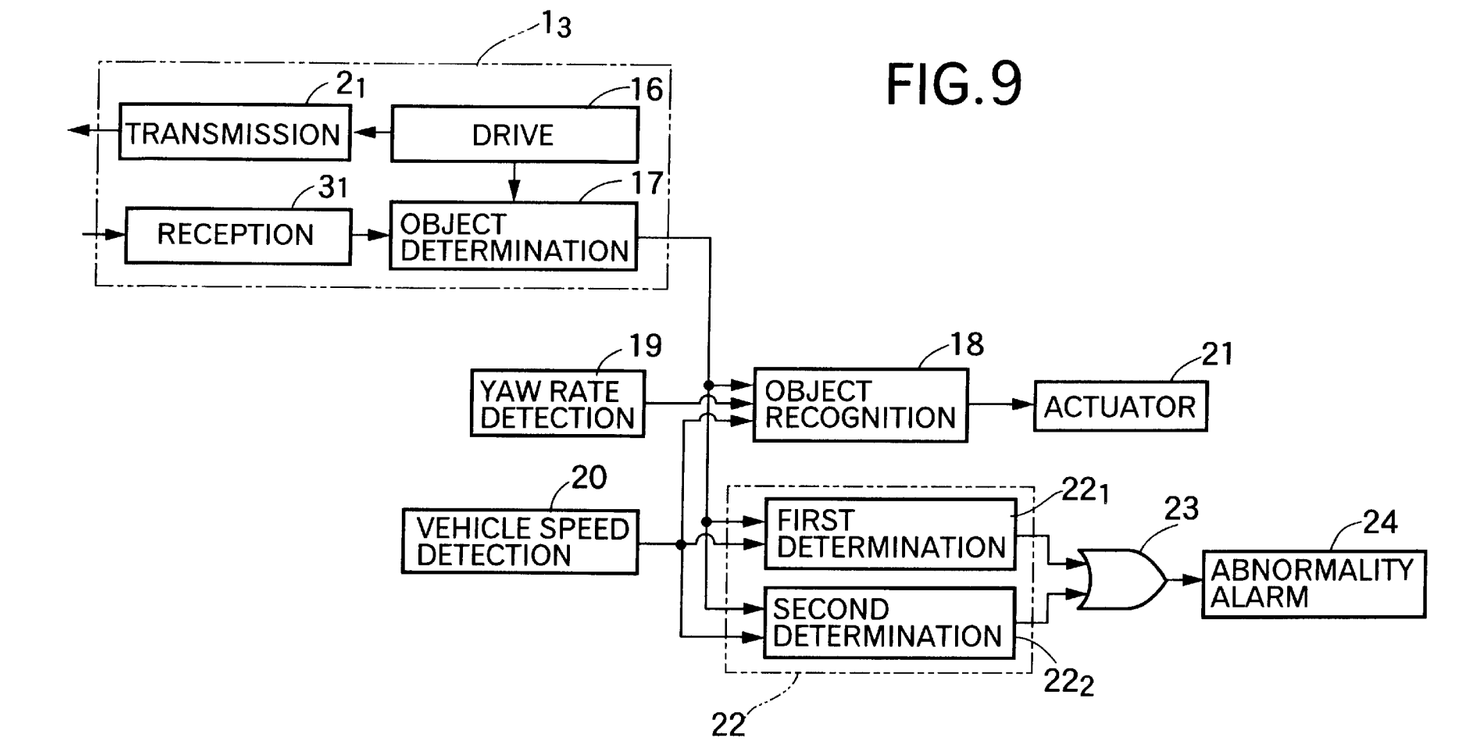
FIG. 9 is a block diagram showing the arrangement of an object detecting system.
Figure 10:
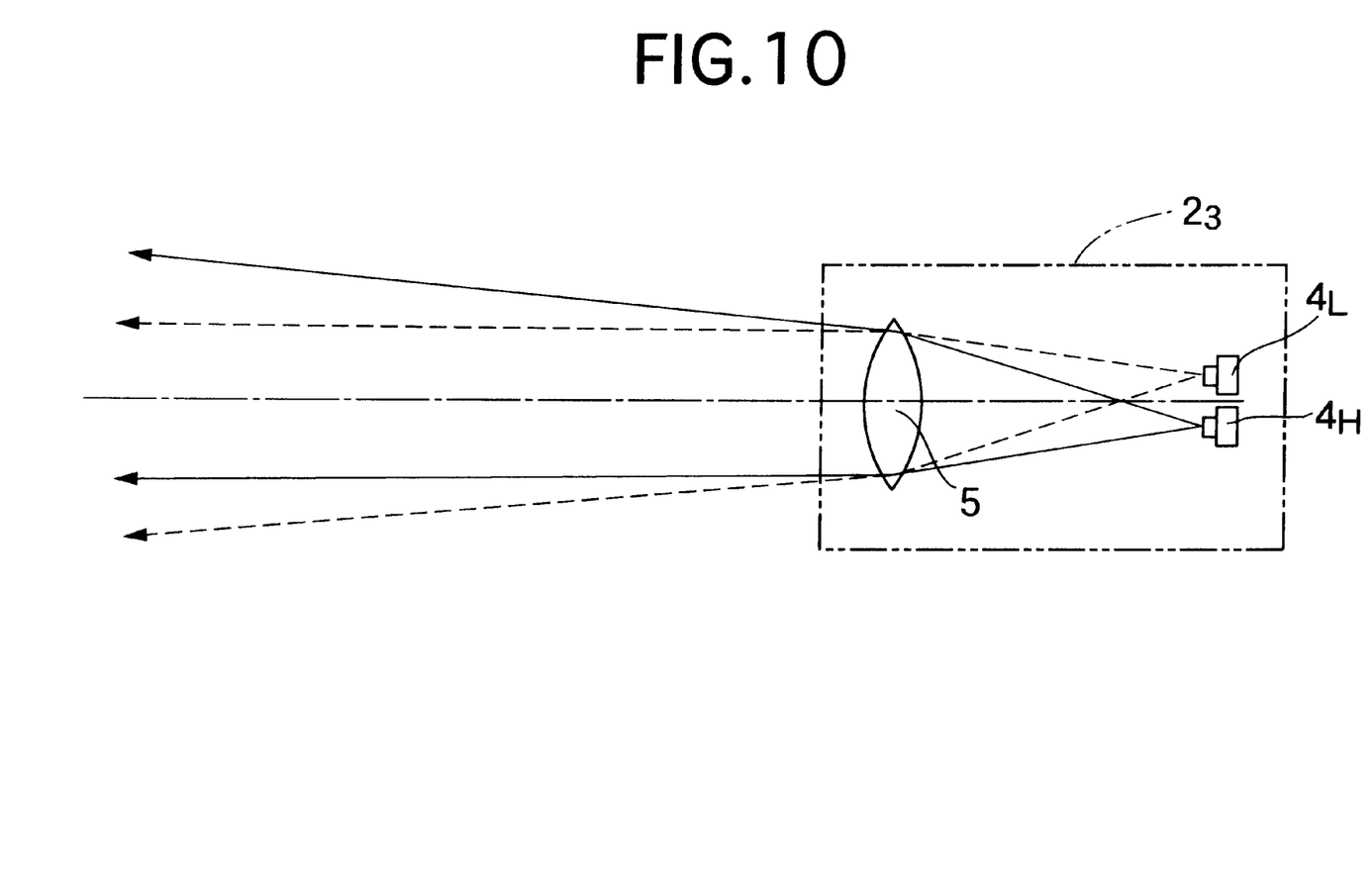
FIG. 10 is a diagram showing the arrangement of an electromagnetic wave transmitting means.

Referring to FIG. 9, the radar $1_3$ includes an electromagnetic wave transmitting means $2_3$ for transmitting an electromagnetic wave forwards in the direction of movement of the vehicle V in a plurality of directions of vertically different angles in correspondence to the detection areas $A_H$ and $A_L$, a reflected wave receiving means $3_3$ for receiving a reflected wave returned from the forward direction in the direction of movement of the vehicle based on the transmission of the electromagnetic wave from the electromagnetic wave transmitting means $2_3$, a drive means 16 for driving the electromagnetic wave transmitting means $2_3$, and an object determining means 17 for determining an object based on the result of reception by the reflected wave receiving means $3_3$.

The electromagnetic wave transmitting means $2_3$ includes a plurality of, e.g., two, laser diodes $4_H$ and $4_L$ which are transmitters for transmitting a laser which is an electromagnetic wave, and a light feed lens 5 disposed in front of the laser diodes $4_H$ and $4_L$. The laser diodes $4_H$ and $4_L$ are sequentially activated by the drive means 16 shown in FIG. 9. The optical axis of the light feed lens 5 is established, so that it is substantially parallel to the travel road surface, when the vehicle V is in the normal traveling state. The laser diode $4_H$ is disposed at a location offset downwards from the optical axis of the light feed lens 5 and transmits the laser corresponding to the detection area $A_H$ upwards in the direction of movement of the vehicle through the light feed lens 5. The laser diode $4_L$ is disposed at a location offset upwards from the optical axis of the light feed lens 5 and transmits the laser corresponding to the detection area $A_L$ downwards in the direction of movement of the vehicle through the light feed lens 5.

When the laser, transmitted from the laser diodes $4_H$ and $4_L$, is scanned in a horizontal direction, a scanning rotatable mirror or the like may be disposed between the laser diodes $4_H$ and $4_L$ and the light feed lens 5, or on the opposite side from the laser diodes $4_H$ and $4_L$ with respect to the light feed lens 5.

The reflected wave receiving means $3_3$ receives a reflected wave in each of the detection areas $A_H$ and $A_L$. The reception result provided by the reflected wave receiving means $3_3$ is input to the object determining means 17.

The object determining means 17 determines in which of the detection areas $A_H$ and $A_L$ and the overlapped region $A_O$ a detected object exists, based on the result of the reception by the reflected wave receiving means $3_3$. A signal indicative of a timing for transmitting a laser from the laser diodes $4_H$ and $4_L$ is input from the drive means 16 to the object determining means 17 in order to determine in which of the areas $A_H$ and $A_L$ and the region $A_O$ the detected object exists.

As a result of the detection by the radar $1_3$, I.e., as a result of the determination by the object determining means 17, it is determined in an object recognizing means 18 whether the object should be recognized as an object which can be an obstacle to the traveling of the vehicle V. Input to the object recognizing means 18 are a detection value detected by a yaw rate detecting means 19 for detecting a yaw rate for determining the direction of movement of the vehicle V, and a detection value detected by a vehicle speed detecting means 20 for detecting a travel speed of the vehicle V. The detected object determined by the object determining means 17 is recognized by the object recognizing means 18 whether it is an object which can be an obstacle to the vehicle V, based on the relative position and the relative momentum between the detected object and the subject vehicle. An actuator 21, such as an alarm for urging a driver of the vehicle V to perform an avoidance operation, an automatic brake for carrying out an automatic avoidance operation and the like, is operated based on the result of the recognition of the object by the object recognizing means 18.

The result of the determination by the object determining means 17 and the detection value detected by the vehicle speed detecting means 20 are input to an abnormality determining means 22. The abnormality determining means 22 determines whether the object detected by the radar $1_3$ is a moving object, based on the result of the detection by the radar $1_3$, i.e., the result of the determination by the object determining means 17 and the detection value detected by the vehicle speed detecting means 20, and carries out the determination of an abnormality for the radar $1_3$ by utilizing the object determined as a moving object. The abnormality determining means 22 includes first and second determining sections $22_1$ and $22_2$.

When radar $1_3$ has detected the presence of a moving object in a region other than the overlapped region $A_O$ in a state in which the attitude of the vehicle V is substantially parallel to the travel road surface, i.e., when the object determining means 17 has determined such a moving object, the first determining section $22_1$ determines that the radar $1_3$ is abnormal, in view of the fact that such a state has been continued for a first predetermined time, e.g., for 2 or more seconds. The determination of the abnormality of the radar $1_3$ by the first determining section $22_1$, is based on the following: when an object which is a moving object, e.g., a preceding vehicle, a reflector on the preceding vehicle or the like, exists ahead of the subject vehicle in the direction of movement of the subject vehicle in a normal state in which the detecting direction of the radar $1_3$ is not vertically offset, such an object must be determined as existing in the overlapped region $A_O$ including the region parallel to the travel road surface by the object determining means 17. However, when the object exists at an extremely near distance ahead of the subject vehicle, the object determining means 17 determines the object as existing outside the overlapped region $A_O$, from the relationship between the radar $1_3$ and the height of the object (e.g., when the reflector on the preceding vehicle exists at a location higher in level with respect to the radar $1_3$). Therefore, the determination of the abnormality is limited to only when the object is at a distance of 10 m or more from the subject vehicle.

Moreover, the first determination section $22_1$ determines that the vehicle V exists at an attitude substantially parallel to the travel road surface, when the detection value detected by the vehicle speed detecting means 20 indicates a stopped state of the vehicle V, or a state in which the vehicle V is traveling at a substantially constant speed.

When the radar $1_3$ does not detect an object which is a moving object in any of the detection areas $A_H$ and $A_L$ in a state in which the vehicle V is traveling, the second determining section $22_2$ determines that the radar $1_3$ is abnormal, when such a state is continued for a second predetermined time or more. The determination of the abnormality of the radar $1_3$ in the second determining section $22_2$ is based on the following: there are few cases where an object such as a preceding vehicle does not exists for a long period of time in the direction of movement of the vehicle V during traveling of the vehicle V. Hence, the radar $1_3$ must detect an object which is a moving object in any of the detection areas $A_H$ and $A_L$ in a state in which the detecting direction of the radar $1_3$ is not largely offset, or in a state in which the radar $1_3$ itself is not out of order. The second predetermined time is set at a relatively long time, e.g., at one hour, taking into consideration that the vehicle may travel on a road where there is light traffic.

Moreover, the second determining section $22_2$ stores the result of the determination at the time when the radar $1_3$ has been determined to be abnormal and retains the result until the radar $1_3$ detects an object, irrespective of the operational state of the vehicle. As long as the second determining section $22_2$ retains the result, it keeps outputting a signal indicative of an abnormal state.

The outputs from the first and second determining sections $22_1$ and $22_2$ in the abnormality determining means 22 are input in parallel to an OR gate 23. An output from the OR gate 23 is input to an abnormality alarm 24 for notifying the driver of an abnormality by voice or by display. Thus, when it is determined in the abnormality determining means 22 that the radar $1_3$ is abnormal, the abnormality alarm 24 is operated for notification of the driver.

The operation of the fifth embodiment will be described below. The radar $1_3$ is constructed to be able to detect objects in the plurality of vertically different areas $A_H$ and $A_L$. The detection areas $A_H$ and $A_L$ are established, so that the overlapped region $A_O$ made by overlapping of the detection areas $A_H$ and $A_L$ includes the region parallel to the travel road surface. Therefore, when the detecting direction of the radar $1_3$ is not vertically offset, an object which is a moving object, such as a preceding vehicle and the like, can be reliably detected in the overlapped region $A_O$. Even when the detecting direction of the radar $1_3$ is vertically offset, an object can be easily detected in either one of the plurality of vertically different detection areas $A_H$ and $A_L$. More specifically, when the nose of the vehicle V is turned up due to a sudden acceleration of the vehicle, a portion of the detection area $A_L$ lower than the overlapped region $A_O$ is used, and when the nose of the vehicle V is turned down due to a sudden deceleration of the vehicle, a portion of the detection area $A_H$ higher than the overlapped region $A_O$ is used.

When an object exists ahead of the subject vehicle in the direction of movement of the subject vehicle in the normal state in which the detecting direction of the radar $1_3$ is not vertically offset, such an object must exist in the overlapped region $A_O$ including the region parallel to the travel road surface. Thus, the first determining section $22_1$ of the abnormality determining means 22 determines that the radar $1_3$ is abnormal, based on the radar $1_3$ detecting the object, which is a moving object, existing in a region other than the overlapped region $A_O$ in a state in which the attitude of the vehicle V is substantially parallel to the travel road surface. Therefore, it is possible to easily determine the abnormal state in which the detecting direction of the radar $1_3$ is offset in either one of the upward and downward directions, thereby notifying the driver of the abnormal state by the abnormality alarm 24. Moreover, in determining the abnormality by the first determining section $22_1$, when a state in which the object exists in the region other than the overlapped region $A_O$ is continued for the first predetermined time (e.g., 2 seconds) or more, it is determined that the radar $1_3$ is abnormal. Therefore, it is possible to avoid determining by mistake that the radar $1_3$ is abnormal, when an object exists for a moment in a region other than the overlapped region $A_O$ due to the temporary yawing of the vehicle body or the like. The first determining section $22_1$ determines that the attitude of the vehicle V is substantially parallel to the travel road surface, when the detection value detected by the vehicle speed detecting means 20 indicates the stopped state of the vehicle V, or the state in which the vehicle V is traveling at a substantially constant speed. Therefore, a special detecting means for detecting the attitude of the vehicle V is not required. Thus, it is possible to simply detect the state in which the attitude of the vehicle V is substantially parallel to the travel road surface.

On an actual road, a footbridge and a signpost existing over the road are detected in the upper detection area $A_H$ by the radar $1_3$, and a cateye, a white line and the like embedded in the surface of the road is detected in the lower detection area $A_L$ by the radar $1_3$. These detected objects are stationary objects which cannot be obstacles to the traveling of the vehicle, and they cannot be recognized by the object recognizing means 18 as objects which are to be detected according to the embodiment of the present invention.

Even in the abnormality determining means 22, the abnormality is first determined in the first determining section $22_1$ based on a fact that an object, which is a moving object such as a preceding vehicle, exists in the region other than the overlapped region $A_O$. In the second determining section $22_2$, the abnormality is determined based on a fact that an object, which is a moving object such as a preceding vehicle, is not detected in any area including the overlapped region $A_O$. Hence, an abnormality cannot be determined by the existence of a stationary object such as those described above.

Further, in the state in which the detecting direction of the radar $1_3$ is not largely offset, or the radar $1_3$ itself is not out of order, the second determining section $22_2$ of the abnormality determining means 22 determines that the radar $1_3$ is abnormal, when the radar $1_3$ detects no objects in any of the detection areas $A_H$ and $A_L$ during the traveling state of the vehicle V, when the radar $1_3$ must detect an object such as a reflector on a preceding vehicle in either one of the detection areas $A_H$ and $A_L$. Therefore, it is possible to easily determine the abnormal state in which the detecting direction of the radar $1_3$ is largely offset, or the radar $1_3$ itself is out of order. Furthermore, it is possible to immediately notify the driver of the abnormal state by the abnormality alarm 24.

Moreover, the second determining section $22_2$ is determines that the radar 13 is abnormal, when the radar $1_3$ does not continuously detect the object for the second predetermined time in any of the detection areas $A_H$ and $A_L$. Therefore, it is possible to reliably detect the abnormality of the radar $1_3$ by setting the second predetermined time in consideration of the vehicle traveling on a road with light traffic.

Further, in order to ensure that the object can be detected in the plurality of vertically different detection areas $A_H$ and $A_L$, the electromagnetic wave transmitting means $2_3$ of the radar $1_3$ includes the plurality of, e.g., two laser diodes $4_H$ and $4_L$ for transmitting the electromagnetic wave in the plurality of vertically different angle directions. Therefore, the radar $1_3$ can be provided with a function of detecting the object in the plurality of vertically different detection areas $A_H$ and $A_L$ using a simple construction. When the object is detected in a portion of the detection area $A_H$ corresponding to the overlapped region $A_O$ by one of the laser diodes $4_H$ and $4_L$, e.g., the laser diode $4_H$, but the object is not detected in a portion of the detection area $A_L$ corresponding to the overlapped region $A_O$ by the other laser diode $4_L$, it can be easily determined that the other laser diode $4_L$ is out of order, and the result of the problem can also be indicated by the abnormality alarm 24.

Figure 11:
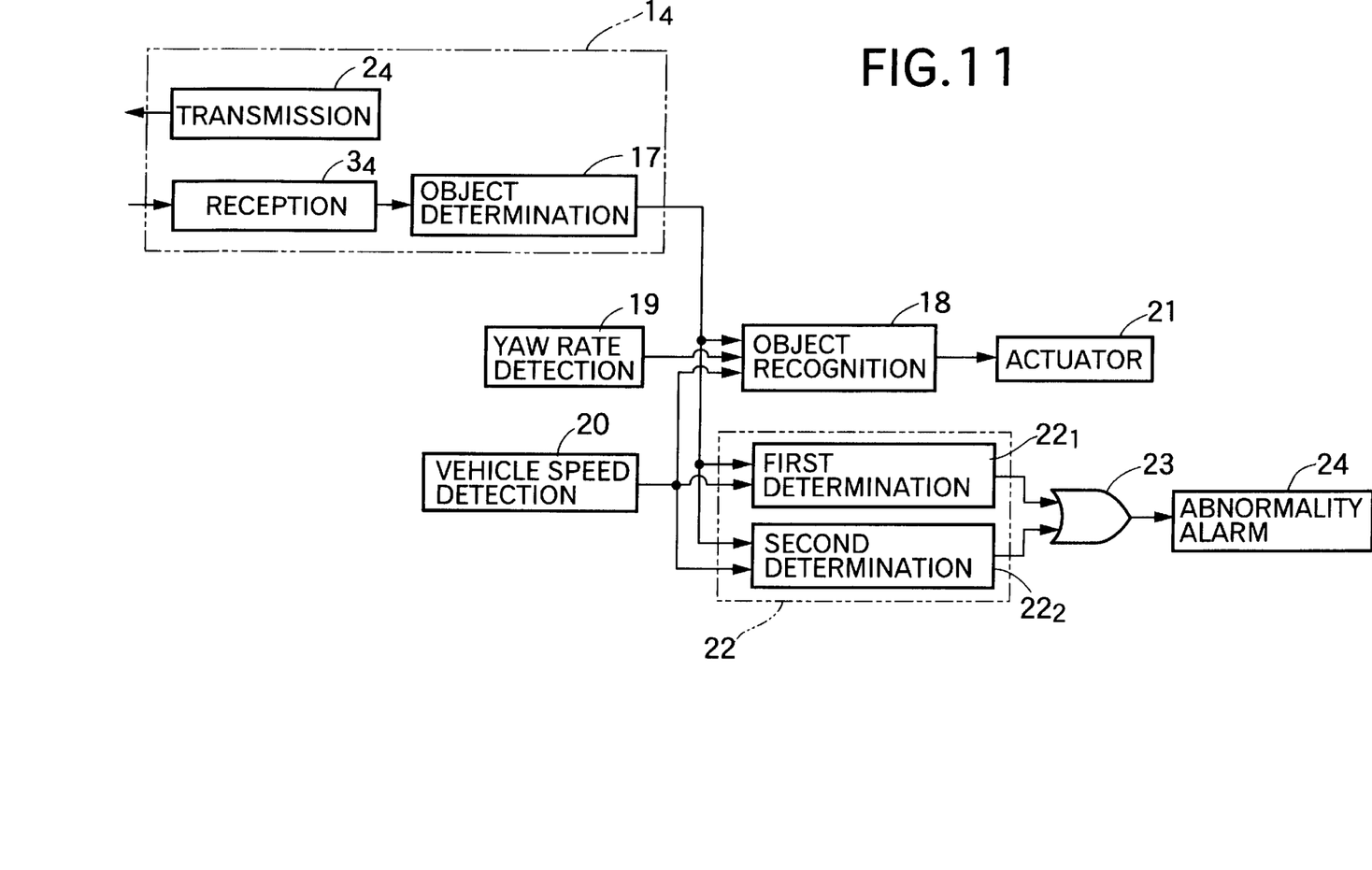
FIG. 11 is a block diagram showing the arrangement of an object detecting system.
Figure 12:
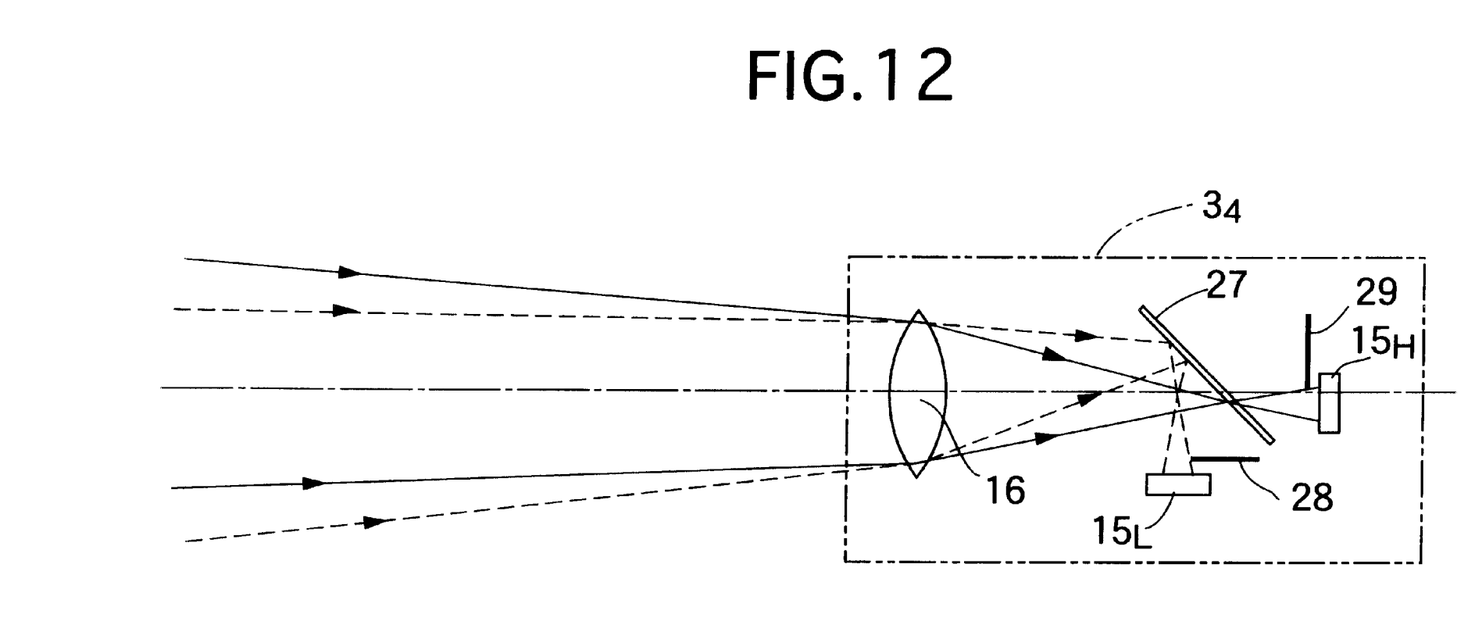
FIG. 12 is a diagram showing the arrangement of a reflected wave receiving means.

FIGS. 11 and 12 show a sixth embodiment. In this embodiment, a radar $1_4$ includes an electromagnetic wave transmitting means $2_4$ for transmitting a laser as an electromagnetic wave, for example, forwards in the direction of movement of the vehicle V, a reflected wave receiving means $3_4$ for receiving reflected waves produced by the reflection of the electromagnetic wave transmitted from the electromagnetic wave transmitting means $2_4$ from an object ahead of the vehicle in the direction of movement of the vehicle, in a plurality of directions of vertically different angle directions, and an object determination means 17.

As shown in FIG. 12, the reflected wave receiving means $3_4$ includes a plurality of, e.g., a pair of photo diodes $15_H$ and $15_L$ which are receivers for receiving the laser reflected waves to generate a signal, a light receiving lens 16 disposed with its optical axis parallel to the travel road surface, a half mirror 27, and throttle plates 28 and 29.

The half mirror 27 is disposed in a rear of the light receiving lens 16 in such a manner that it is located above the photo diode $15_L$ for receiving the reflected wave from the object in the detection area $A_L$ and is located in front of the photo diode $15_H$ for receiving the reflected wave from the object in the detection area $A_H$. The reflected wave from the object in the detection area $A_L$ is reflected from the half mirror 27, is throttled by the throttle plate 28 and is input to the photo diode $15_L$. The reflected wave from the object in the detection area $A_H$ penetrates through the half mirror 27, is throttled by the throttle plate 29 and is input to the photo diode $15_H$.

The electromagnetic transmitting means $2_4$ is arranged to transmit a laser as an electromagnetic wave over the entire detection areas $A_H$ and $A_L$. The arrangement other than the radar $1_4$ is similar to that in the fifth embodiment.

Even with the sixth embodiment, an effect similar to that in the fifth embodiment can be provided.

The object detecting system for detecting the object existing ahead of the vehicle V in the direction of movement of the vehicle V has been described in each of the embodiments. However, the present invention is also applicable to an object detecting system for detecting an object existing behind the vehicle in the direction of movement of the vehicle.

In addition, in place of the laser, a millimeter wave can be used as an electromagnetic wave. Further, a detection value detected by an acceleration/deceleration detecting means for detecting an acceleration or deceleration of the vehicle V can be used in place of the vehicle speed detecting means to determine that the vehicle V is in the stopped state, or is traveling at a substantially constant speed. The detection value can be used to determine that the vehicle V has an attitude substantially parallel to the travel road surface, when the vehicle V is in the stopped state, or is traveling at the substantially constant speed.

Although the embodiments of the present invention have been described in detail, it will be understood that the present invention is not limited to the above-described embodiments, and various modifications in design may be made without departing from the spirit and scope of the invention defined in the claims.

What is claimed is:

1. An object detecting system for a vehicle, comprising:
   a radar which includes an electromagnetic wave transmitting means for transmitting an electromagnetic wave in a direction of movement of the vehicle, and a reflected wave receiving means for receiving a reflected wave from an object existing ahead of the vehicle in the direction of movement of the vehicle; and
   a determining means for determining presence or absence of an obstacle in the direction of movement of the vehicle based on a result of detection by said radar,
   wherein said radar can detect objects in each of a plurality of vertically different detection areas, and
   wherein the detection areas are established so that an overlapped region, produced by overlapping of the detection areas, includes a region parallel to a travel road surface.

2. An object detecting system for a vehicle according to claim 1, further including a pitch angle detecting means for detecting a pitch angle of the vehicle, and a selecting means for selecting one of said plurality of detection areas, which is at an angle nearest to an angle parallel to said travel road surface based on a result of detection by said pitch angle detecting means, and inputting said selected one of detection areas to said determining means.

3. An object detecting system for a vehicle according to claim 2, wherein said pitch angle detecting means is arranged to detect said pitch angle based on indicators representative of strokes of front and rear suspensions of the vehicle.

4. An object detecting system for a vehicle according to claim 2, wherein the vehicle is provided with an acceleration/deceleration detecting means for detecting an acceleration and deceleration of the vehicle, and said pitch angle detecting means is arranged to calculate said pitch angle based on a result of detection by said acceleration/deceleration detecting means.

5. An object detecting system for a vehicle according to claim 2, wherein the vehicle is provided with at least one of a brake-operated state detecting means for detecting an operated state of a brake, and a throttle-operated state detecting means for detecting an operated state of a throttle, and said pitch angle detecting means is arranged to detect said pitch angle based on a result of detection performed by at least one of said brake-operated state detecting means and the throttle-operated state detecting means.

6. An object detecting system for a vehicle according to claim 1, further including an abnormality determining means for determining that the radar is abnormal when the radar detects existence of the object in a region other than said overlapped region in a state in which an attitude of the vehicle is substantially parallel to the travel road surface.

7. An object detecting system for a vehicle according to claim 6, wherein when a state, in which said radar has detected the existence of the object in said region other than said overlapped region, is continued for a first predetermined time or more, said abnormality determining means determines that said radar is abnormal.

8. An object detecting system for a vehicle according to claim 7, further including a vehicle speed detecting means for detecting a vehicle speed, and wherein said abnormality determining means determines a state in which the attitude of the vehicle is substantially parallel to the travel road surface, when a detection value detected by said vehicle speed detecting means indicates one of a stopped state of the vehicle and a state in which the vehicle is traveling at a substantially constant speed.

9. An object detecting system for a vehicle according to claim 6, further including a vehicle speed detecting means for detecting a vehicle speed, and wherein said abnormality determining means determines a state in which the attitude of the vehicle is substantially parallel to the travel road surface, when a detection value detected by said vehicle speed detecting means indicates one of a stopped state of the vehicle and a state in which the vehicle is traveling at a substantially constant speed.

10. An object detecting system for a vehicle according to claim 6, further including a vehicle speed detecting means for detecting a vehicle speed, and wherein said abnormality determining means is arranged, so that said object determined as a moving object based on the result of the detection by said radar and a detection value detected by said vehicle speed detecting means is used for determining whether said radar is abnormal.

11. An object detecting system for a vehicle according to claim 1, further including an abnormality determining means for determining that said radar is abnormal when said radar detects no object in any of said detection areas during a traveling state of the vehicle.

12. An object detecting system for a vehicle according to claim 11, further including an abnormality alarm which is operated for notification of a driver in response to a determination that the radar is abnormal by the abnormality determining means.

13. An object detecting system for a vehicle according to claim 11, wherein said abnormality determining means determines that said radar is abnormal when said radar continuously detects no object in any of said detection areas for a second predetermined time or more.

14. An object detecting system for a vehicle according to claim 13, further including an abnormality alarm which is operated for notification of a driver in response to a determination that the radar is abnormal by said abnormality determining means.

15. An object detecting system for a vehicle according to claim 14, wherein said abnormality determining means stores a result of determination at a time when it is determined that said radar is abnormal, irrespective of an operational state of the vehicle, until said radar detects the object, and as long as such storage is continued, said abnormality determining means outputs a signal indicative of a command to operate the abnormality alarm.

16. An object detecting system for a vehicle according to claim 11, further including a vehicle speed detecting means for detecting a vehicle speed, and wherein said abnormality determining means is arranged, so that said object determined as a moving object based on a result of detection by said radar and a detection value detected by said vehicle speed detecting means is used for determining whether said radar is abnormal.

* * * * *